United States Patent
Yoon et al.

(10) Patent No.: US 10,347,429 B2
(45) Date of Patent: Jul. 9, 2019

(54) CAPACITOR AND METHOD FOR MANUFACTURING THE SAME

(71) Applicant: SAMSUNG ELECTRO-MECHANICS CO., LTD., Suwon-si, Gyeonggi-do (KR)

(72) Inventors: Gun Jung Yoon, Suwon-si (KR); Hyun Hee Gu, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/647,037

(22) Filed: Jul. 11, 2017

(65) Prior Publication Data
US 2018/0144869 A1    May 24, 2018

(30) Foreign Application Priority Data
Nov. 23, 2016    (KR) .................. 10-2016-0156600

(51) Int. Cl.
*H01G 4/30* (2006.01)
*H01G 4/232* (2006.01)
*H01G 4/012* (2006.01)

(52) U.S. Cl.
CPC ............ *H01G 4/30* (2013.01); *H01G 4/232* (2013.01); *H01G 4/012* (2013.01)

(58) Field of Classification Search
CPC ........................... H01G 4/228; H01G 4/232
See application file for complete search history.

(56) References Cited

U.S. PATENT DOCUMENTS

| 8,837,112 B2 * | 9/2014 | Gu ................ H01G 4/12 361/301.2 |
| 9,087,644 B2 * | 7/2015 | Jeon ................ H01G 4/30 |

(Continued)

FOREIGN PATENT DOCUMENTS

| JP | 2003234239 A * | 8/2003 |
| KR | 10-2005-0040159 A | 5/2005 |

(Continued)

OTHER PUBLICATIONS

Office Action issued in corresponding Korean Patent Application No. 10-2016-0156600, dated Nov. 14, 2017, with English Translation.

*Primary Examiner* — Eric W Thomas
(74) *Attorney, Agent, or Firm* — Morgan, Lewis & Bockius, LLP

(57) ABSTRACT

A capacitor includes a body including a dielectric layer and a plurality of first and second internal electrodes which are alternately disposed while having the dielectric layer therebetween, including first to sixth surfaces; a first external electrode disposed on the third surface and including a first extension portion extending from the third surface to portions of the first, second, fifth, and sixth surfaces, adjacent to the third surface; a second external electrode disposed on the fourth surface and including a second extension portion extending from the fourth surface to portions of the first, second, fifth, and sixth surfaces, adjacent to the fourth surface; and a plating prevention member covering the first and second extension portions disposed on the fifth surface and the sixth surface.

12 Claims, 10 Drawing Sheets

(56) References Cited

U.S. PATENT DOCUMENTS

| | | | |
|---|---|---|---|
| 2009/0283819 A1* | 11/2009 | Ishikawa | H01L 21/28282 257/324 |
| 2013/0279072 A1* | 10/2013 | Okamoto | H01G 4/30 361/301.4 |
| 2014/0085767 A1* | 3/2014 | Kang | H01G 4/12 361/301.4 |
| 2014/0196936 A1 | 7/2014 | Hong et al. | |
| 2014/0345926 A1 | 11/2014 | Lee et al. | |
| 2015/0043124 A1 | 2/2015 | Kim et al. | |
| 2017/0345576 A1* | 11/2017 | Tsuyoshi | H01G 4/33 |

FOREIGN PATENT DOCUMENTS

| | | |
|---|---|---|
| KR | 2005-0071733 A | 7/2005 |
| KR | 10-2007-0077726 A | 7/2007 |
| KR | 10-1444615 B1 | 9/2014 |
| KR | 10-2014-00136740 A | 12/2014 |
| KR | 10-1548793 B1 | 8/2015 |
| KR | 2015-0118385 A | 10/2015 |

\* cited by examiner

A

CAPACITOR AND METHOD FOR MANUFACTURING THE SAME

CROSS-REFERENCE TO RELATED APPLICATION(S)

This application claims benefit of priority to Korean Patent Application No. 10-2016-0156600 filed on Nov. 23, 2016 in the Korean Intellectual Property Office, the disclosure of which is incorporated herein by reference in its entirety.

TECHNICAL FIELD

The present disclosure relates to a capacitor and a method for manufacturing the same.

BACKGROUND

In accordance with the recent trend toward the miniaturization of electronic products, multilayer ceramic electronic components have also recently been required to be miniaturized and have a large capacity.

Accordingly, achieving thinness and multilayers of dielectrics and internal electrodes has been a goal which producers have tried to reach by various methods. Recently, as a thickness of the dielectric layer has been thinned, capacitors having an increased number of laminated layers are manufactured.

As the same time, in accordance with the demand for the miniaturization of the electronic product, a solution that may reduce an area required at the time of mounting the electronic product is required.

SUMMARY

An aspect of the present disclosure may provide a capacitor capable of improving mounting density of the capacitor in a width direction of the capacitor by preventing a solder from being attached to both end surfaces of a body in a length direction of the body at the time of mounting the capacitor on a board.

An aspect of the present disclosure may also provide a capacitor capable of improving mounting density of the capacitor in a length direction of the capacitor by forming external electrodes, as a thin film, to have uniform thickness, and reducing a length required to mount the capacitor.

According to an aspect of the present disclosure, a capacitor may include a body including a dielectric layer and a plurality of first and second internal electrodes, which are alternately disposed, while having the dielectric layer therebetween, including first and second surfaces opposing each other, third and fourth surfaces connected to the first and second surfaces and opposing each other, and fifth and sixth surfaces opposing each other, connected to the first and second surfaces connected to the third and fourth surfaces, and exposing one terminal of each of the first and second internal electrodes through the third and fourth surfaces; a first external electrode disposed on the third surface, including a first extension portion extending from the third surface to portions of the first, second, fifth, and sixth surfaces, adjacent to the third surface; a second external electrode disposed on the fourth surface, including a second extension portion extending from the fourth surface to portions of the first, second, fifth, and sixth surfaces, adjacent to the fourth surface; and a plating prevention member to cover the first and second extension portions disposed on the fifth surface and the sixth surface.

According to an aspect of the present disclosure, a method for manufacturing a capacitor may include preparing a body including a dielectric layer and a plurality of first and second internal electrodes which are alternately disposed, while having the dielectric layer therebetween, including first and second surfaces opposing each other, third and fourth surfaces connected to the first and second surfaces and opposing each other, and fifth and sixth surfaces opposing each other, connected to the first and second surfaces connected to the third and fourth surfaces, and exposing one terminal of each of the first and second internal electrodes through the third and fourth surfaces; forming a first external electrode on the third surface, including a first extension portion extending from the third surface to portions of the first, second, fifth, and sixth surfaces, adjacent to the third surface; forming a second external electrode on the fourth surface, including a second extension portion extending from the fourth surface to portions of the first, second, fifth, and sixth surfaces, adjacent to the fourth surface; and forming a plating prevention member to cover the first and second extension portions disposed on the fifth surface and the sixth surface.

BRIEF DESCRIPTION OF DRAWINGS

The above and other aspects, features and other advantages of the present disclosure will be more clearly understood from the following detailed description, taken in conjunction with the accompanying drawings, in which.

DETAILED DESCRIPTION

Hereinafter, exemplary embodiments of the present disclosure will be described in detail with reference to the accompanying drawings.

Capacitor

Figure 1:
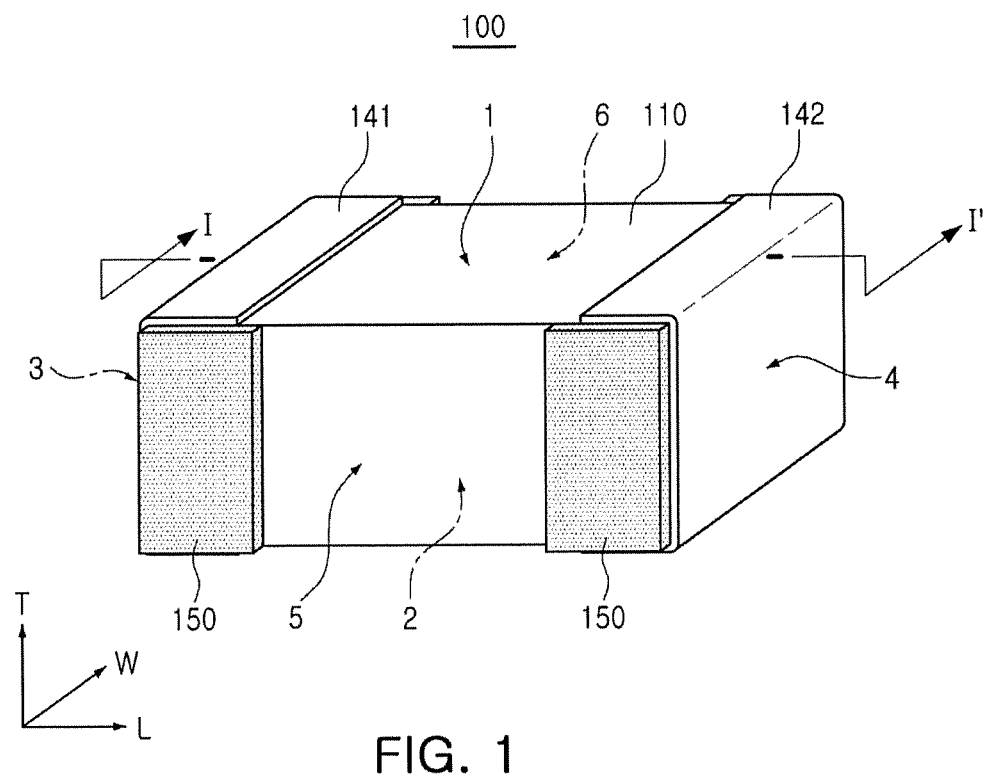
FIG. 1 schematically illustrates a perspective view of a capacitor according to an exemplary embodiment in the present disclosure.
Figure 2:
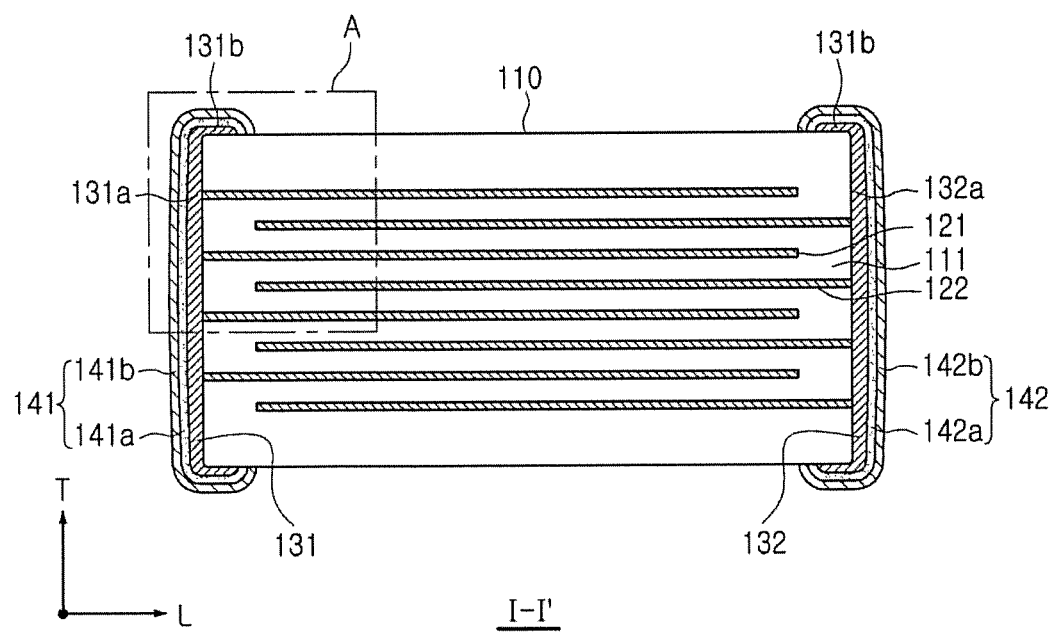
FIG. 2 schematically illustrates a cross-sectional view taken along the line I-I' of FIG. 1.
Figure 3:
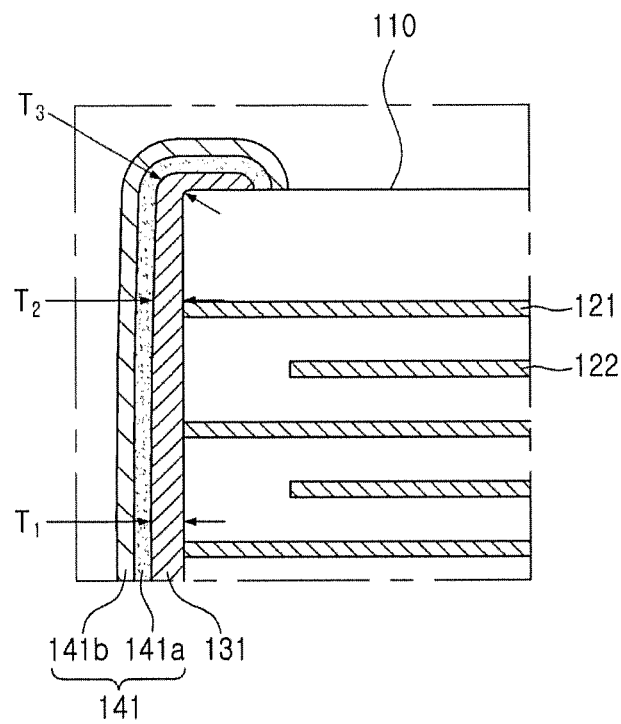
FIG. 3 schematically illustrates an enlarged cross-sectional view of the part A of FIG. 2.

FIG. 1 schematically illustrates a perspective view of a capacitor according to an exemplary embodiment in the present disclosure, FIG. 2 schematically illustrates a cross-sectional view taken along the line I-I' of FIG. 1, and FIG. 3 schematically illustrates an enlarged cross-sectional view of the part A of FIG. 2.

A capacitor according to an exemplary embodiment will be described with reference to FIGS. 1 through 3.

Referring to FIGS. 1 through 3, a capacitor 100 according to an exemplary embodiment may include a body 110, first and second internal electrodes 121 and 122, and first and second external electrodes 131 and 132.

The body 110 may be formed in a hexahedron having both end surfaces in a length direction L of the body, both end surfaces in a width direction W thereof, and both end surfaces in a thickness direction T, thereof. That is, the body 110 may include first and second surfaces 1 and 2 opposing each other, third and fourth surfaces 3 and 4 connected to the first and second surfaces 1 and 2 and opposing each other, and fifth and sixth surfaces 5 and 6 opposing each other, connected to the first and second surfaces 1 and 2 connected to the third and fourth surfaces 3 and 4. Here, the first and second surfaces 1 and 2 refer to both end surfaces of the body 110 in the length direction L of the body 110, the third and fourth surfaces 3 and 4 refer to both end surfaces of the body 110 in the thickness direction T of the body 110, and the fifth and sixth surfaces 5 and 6 refer to both end surfaces of the body 110 in the width direction W of the body 110.

The body 110 may be formed by laminating a plurality of dielectric layers 111 in the thickness direction T and then sintering the plurality of dielectric layers 111. A shape and a dimension of the body 110 and the number of laminated dielectric layers 111 are not limited to those illustrated in the present exemplary embodiment.

Further, the plurality of dielectric layers 111 forming the body 110 may be in a sintered state, and may be integrated with each other so that a boundary between adjacent dielectric layers 111 is not readily apparent without using a scanning electron microscope (SEM).

The dielectric layer 111 may have a thickness which is arbitrarily changed in accordance with a capacitance design of the capacitor 100, and may include ceramic powders having high permittivity, for example, barium titanate (BaTiO$_3$) based powders or strontium titanate (SrTiO$_3$) based powders. However, the material of the dielectric layer 111 is not limited thereto. In addition, various ceramic additives, organic solvents, plasticizers, binders, dispersing agents, and the like may be added to the ceramic powders in accordance with the object of the present disclosure.

An average particle diameter of a ceramic powder used for forming the dielectric layer 111 is not particularly limited, but may be adjusted to achieve the object of the present disclosure, and may be adjusted to, for example, 400 nm or less.

A plurality of internal electrodes 121 and 122 may include first internal electrodes 121 and second internal electrodes 122 having different polarities from each other, and the internal electrodes 121 and 122 may be formed in a predetermined thickness, while having a plurality of dielectric layers 111 laminated in the thickness direction T of the body 110 therebetween.

The first internal electrode 121 and the second internal electrode 122 may be formed to be alternately exposed to the third surface 3 and the fourth surface 4 of the body along a laminated direction of the dielectric layers 111 by printing a conductive paste including a conductive metal, and may be insulated from each other by the dielectric layer 111 disposed therebetween.

That is, the first and second internal electrodes 121 and 122 may each be electrically connected to the first and second external electrodes 131 and 132 formed on the third surface 3 and the fourth surface 4 of the body 110 through portions alternately exposed to both end surfaces of the body in the length direction of the body 110.

Therefore, when a voltage is applied to the first and second external electrodes 131 and 132, charges may be accumulated between the first and second internal electrodes 121 and 122 opposing each other. In this case, capacitance of the capacitor 100 may be proportional to an area of a region in which the first and second internal electrodes 121 and 122 overlap each other.

That is, in a case in which the area of the region in which the first and second internal electrodes 121 and 122 overlap each other is significantly increased, the capacitance of the capacitor having the same size may also be significantly increased.

As will be described below, in the capacitor 100 according to an exemplary embodiment, since the external electrodes have a thin and uniform thickness, the area in which the internal electrodes overlap may be significantly increased, to thereby implement a capacitor having high capacity.

Widths of the first and second internal electrodes 121 and 122 may be determined depending on a use. For example, the widths of the first and second internal electrodes 121 and 122 may be determined to be in the range of 0.2 to 1.0 mm, in consideration of a size of the body 110, but is not limited thereto.

In addition, the conductive metal included in the conductive paste forming the first and second internal electrodes 121 and 122 may be nickel (Ni), copper (Cu), palladium (Pd), silver (Ag), lead (Pb), platinum (Pt), or an alloy thereof, but is not limited thereto.

The external electrodes 131 and 132 may include a first external electrode 131 and a second external electrode 132, each disposed on the third surface 3 and the fourth surface 4 of the body 110.

The first external electrode 131 may include a first connecting part 131a disposed on the third surface 3 of the body 110, and a first extension portion 131b extending to portions of the first, second, fifth, and sixth surface 1, 2, 5, and 6, adjacent to each other from the first connecting part 131a. The second external electrode 132 may include a second connecting part 132a disposed on the fifth surface 4 of the body 110, and a second extension portion 132b extending to portions of the first, second, fifth, and sixth surface 1, 2, 5, and 6, adjacent to each other from the second connecting part 132a.

The first and second connecting parts 131a and 132a may be in contact with the first and second internal electrodes 121 and 122 exposed to the third surface 3 and the fourth surface 4, respectively, to serve to connect a power source connected to the outside to the first and second internal electrodes 121 and 122.

The first and second extension portions 131b and 132b may serve to increase adhesion to the body 110 of the first and second external electrodes 131 and 132.

Referring to FIG. 1, a plating prevention member 150 may be disposed on the fifth surface 5 and the sixth surface 6 of the body 110.

The plating prevention member 150 may cover the first and second extension portions 131b and 132b disposed on the fifth surface 5 and the sixth surface 6 of the body 110.

The plating prevention member 150 may serve to prevent a plating layer from being formed on the fifth layer 5 and the sixth layer 6 of the body 110 when forming plating layers 141 and 142 on the external electrodes 131 and 132.

The plating prevention member 150 may be formed of an insulating material, for example, an epoxy, but is not limited thereto.

In a case in which the capacitor is mounted on the board, the capacitor may be attached to the board and, at the same time, the capacitor is electrically connected to an electrode pad of the board using a solder.

In general, the external electrode may include an electrode layer disposed on a front surface, and an extension portion extending to an adjacent circumference surface from the electrode layer, and the plating layer may be formed on the entirety of the external electrode, including the extension portion.

When the capacitor is mounted on the board, the solder may also be attached to a band portion including the front part.

That is, an area required to mount the capacitor on the board may include an area of the capacitor, as well as a region in which the solder is formed.

However, since the capacitor 100 according to an exemplary embodiment includes the plating prevention member 150 covering the first and second extension portions 131b and 132b disposed on the fifth surface 5 and sixth surface 6, the formation of the solder on the fifth surface 5 and the sixth surface 6 of the body 110 may be prevented. Therefore, the capacitor 100 according to the exemplary embodiment may reduce the area required to mount the capacitor on the board in the width direction thereof, and mounting density of the capacitor in the width direction thereof may be improved.

As a conventional method for forming external electrodes, a method for dipping the body 110 in a paste including a metal component has primarily been used.

In a case in which the external electrodes are formed by the dipping method, since the external electrodes may not be uniformly coated due to fluidity and viscosity of the paste, a difference may occur between a coating thickness of a central portion and a corner portion of the external electrode.

As such, in a case in which the thickness of the external electrode is formed to be non-uniform, glass beading or blister may occur in the central portion, which is thickly coated, to thereby cause plating defect and shape defect, and the corner portion, which is thinly coated, may be vulnerable to a plating solution permeation to thereby cause degradation of reliability.

In addition, in a case in which the corner portion, vulnerable to the plating solution, is intended to be supplemented, the coating thickness of the central portion needs to be increased, which may place a limit on the amount that the size of the capacitor may be increased, to increase capacitance.

According to an exemplary embodiment, the first and second plating layers 141 and 142 may be disposed on the first and second external electrodes 131 and 132, disposed on both end surfaces of the body 110 in the length direction L of the body 110, and over the first and second external electrodes 131 and 132.

Since the first and second external electrodes 131 and 132 are not formed by the conventional dipping method, the first and second external electrodes 131 and 132 may each be formed on the third and fourth surfaces of the body 110 and may be minimally formed on the first surface 1, second surface 2, fifth surface 5, and sixth surface 6, such that the external electrodes may be formed to have a thin and uniform thickness.

As a result, the formation area of the internal electrodes may be increased, to significantly increase the area in which the internal electrodes overlap, thereby implementing a capacitor having high capacity.

In addition, unlike the external electrodes formed by the conventional dipping method, since the external electrodes are formed as a thin film to have a uniform thickness, a length of the capacitor required to mount the capacitor on the board may be reduced, to thereby improve mounting density of the capacitor in the length direction of the capacitor.

According to an exemplary embodiment, the first and second external electrodes 131 and 132 may be formed by a sheet transfer method or a pad transfer method, unlike the conventional dipping method.

The first and second external electrodes 131 and 132 may be formed of the same conductive metal as that of the first and second internal electrodes 121 and 122, but are not limited thereto. For example, the first and second external electrodes 131 and 132 may be formed of copper (Cu), silver (Ag), nickel (Ni), or an alloy thereof.

According to an exemplary embodiment, when a thickness of the first and second external electrodes 131 and 132 in a central portion of the body 110, in the thickness direction of the body 110, is T1, and a thickness of the first and second external electrodes 131 and 132, at a point at which the outermost first and second internal electrodes 121 and 122, among the first and second internal electrodes 121 and 122, are positioned is T2, a relationship of $0.8 \leq T2/T1 \leq 1.2$ may be satisfied.

The thickness T1 of the first and second external electrodes 131 and 132 in the central portion of the body 110, in the thickness direction of the body 110, may refer to a thickness of the external electrodes encountering a virtual line when the virtual line is drawn in the length direction of the body 110, from the central portion point in the thickness direction of the body 110.

Similarly, the thickness T2 of the first and second external electrodes 131 and 132, at the point at which the outermost first and second internal electrodes 121 and 122 among the first and second internal electrodes 121 and 122, are positioned, may refer to a thickness of the external electrodes encountering a virtual line when the virtual line is drawn in the length direction of the body 110 from a position of the internal electrode disposed at the outermost portion of the body 110 in the thickness direction of the body 110.

Since a ratio of T2/T1 satisfies $0.8 \leq T2/T1 \leq 1.2$, a degradation of reliability may be prevented by reducing a deviation between the thickness T1 of the first and second external electrodes 131 and 132 in the central portion of the body 110 in the thickness direction of the body 110, and the thickness T2 of the first and second external electrodes 131 and 132, at the point at which the outermost first and second internal electrodes 121 and 122, among the first and second internal electrodes 121 and 122, are positioned.

In a case in which the ratio of T2/T1 is less than 0.8 or exceeds 1.2, since the thickness deviation of the external electrodes may be increased, the plating solution may permeate a portion having a thin thickness, to thereby cause the degradation of reliability.

According to an exemplary embodiment, when a thickness of the first and second external electrodes 131 and 132 in a corner portion of the body 110 is T3, a relationship of $0.4 \leq T3/T1 \leq 1.0$ may be satisfied.

The thickness T3 of the first and second external electrodes 131 and 132 in the corner portion of the body 110 may refer to a thickness of the first and second external electrodes 131 formed in a region of the corner portion of the body 110.

Since a ratio of T2/T1 satisfies $0.4 T3/T1 \leq 1.0$, a degradation of reliability may be prevented by reducing a deviation between the thickness T1 of the first and second external electrodes 131 and 132 in the central portion of the body 110 in the thickness direction of the body 110, and the thickness T3 of the first and second external electrodes 131 and 132 at the corner portion of the body 110.

In a case in which the ratio of T3/T1 is less than 0.4 or exceeds 1.0, since the thickness deviation of the first and second external electrodes 131 and 132 is increased, plating solution may permeate a portion having a thin thickness, to thereby cause the degradation of reliability.

As illustrated in FIG. 2, the external electrodes 131 and 132 may include the first and second plating layers 141 and 142 disposed on the first and second external electrodes 131 and 132.

The plating layers 141 and 142 are not limited thereto, but may include nickel plating layers 141a and 142a, and tin plating layers 141b and 142b disposed on the nickel plating layers 141a and 142a.

Since the first and second plating layers 141 and 142 are formed after the plating prevention member 150 is disposed on the first and second extension portions 131b and 132b, disposed on the fifth surface 5 and the sixth surface 6, the first and second plating layers 141 and 142 may not be formed on the fifth surface 5 and the sixth surface 6.

Therefore, the first and second plating layers 141 and 142 may be disposed on the first and second external electrodes 131 and 132, disposed on the third surface 3 and the fourth surface 4 among the first and second external electrodes 131 and 132, and may extend to portions of the first surface 1 or portions of the second surface 2, from the third surface 3 and the fourth surface 4.

Since the first and second plating layers 141 and 142 are not formed on the fifth surface 5 nor on the sixth surface 6 of the body 110, the solder may be prevented from being attached to the board in the width direction when the capacitor 100 is mounted on the board, to thereby reduce the area required to mount the capacitor 100 in the width direction.

In addition, when the first surface 1 or the second surface 2 is provided as a mounting surface, since the first and second plating layers 141 and 142 extending to the portions of the first surface 1 and of the second surface 2, adhesion strength of the capacitor 100 to the mounted board may be improved.

Figure 4:
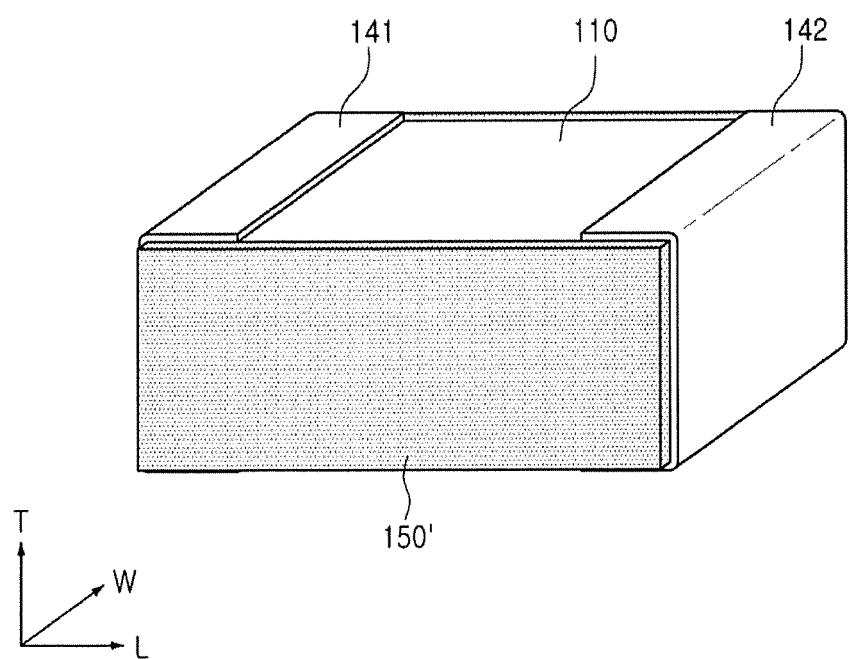
FIG. 4 schematically illustrates a perspective view of a capacitor according to another exemplary embodiment in the present disclosure.

FIG. 4 schematically illustrates a perspective view of a capacitor 100' according to another exemplary embodiment in the present disclosure.

In describing the capacitor 100' according to another exemplary embodiment, a description of components the same as those of the capacitor 100, according to an exemplary embodiment described above, will be omitted.

Referring to FIG. 4, a plating prevention layer 150' of the capacitor 100' according to another exemplary embodiment may cover the entirety of the fifth surface 5 and the sixth surface 6 of the body 110.

Since the plating prevention layer 150' covers the entirety of the fifth surface 5 and the sixth surface 6 of the body 110, the plating prevention layer 150' may prevent the plating layers from being formed on the fifth surface 5 and the sixth surface 6 and prevent conductive foreign materials from permeating the body 110, to thereby improve reliability of the capacitor 100'.

Method for Manufacturing Capacitor

A method for manufacturing a capacitor according to another exemplary embodiment in the present disclosure may include preparing a body including a dielectric layer and a plurality of first and second internal electrodes which are alternately disposed while having the dielectric layer therebetween, including first and second surfaces 1 and 2 opposing each other, third and fourth surfaces 3 and 4 connected to the first and second surfaces 1 and 2 and opposing each other, and fifth and sixth surfaces 5 and 6 opposing each other, connected to the first and second surfaces 1 and 2 connected to the third and fourth surfaces 3 and 4, and exposing one terminal of each of the first and second internal electrodes through the third and fourth surfaces 3 and 4; forming a first external electrode on the third surface and including a first extension portion extending from the third surface to the first, second, fifth, and sixth surfaces, adjacent to the third surface; forming a second external electrode on the fourth surface and including a second extension portion extending from the fourth surface to portions of the first, second, fifth, and sixth surfaces, adjacent to the fourth surface; and forming a plating prevention member to cover the first and second extension portions disposed on the fifth surface 5 and the sixth surface 6.

Hereinafter, a method for manufacturing a capacitor according to another exemplary embodiment will be described with reference to FIGS. 5A through 10. However, for the sake of clarity of the description, reference will be made to FIGS. 1 through 4 as a supplement.

Figure 5A:
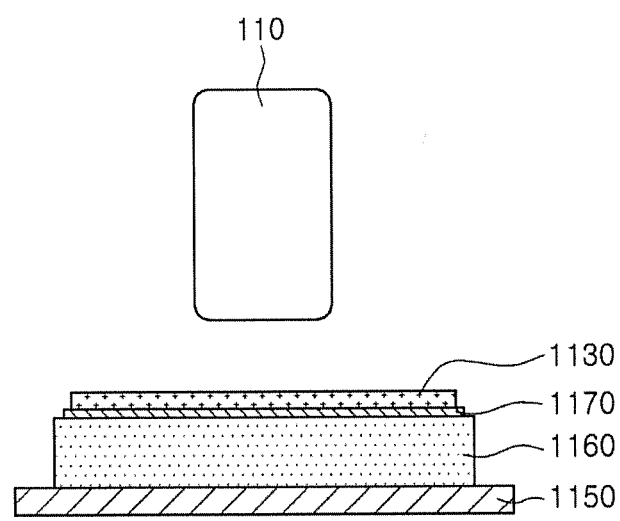
FIGS. 5A through 10 illustrate a method for manufacturing a capacitor according to another exemplary embodiment in the present disclosure.
Figure 5B:
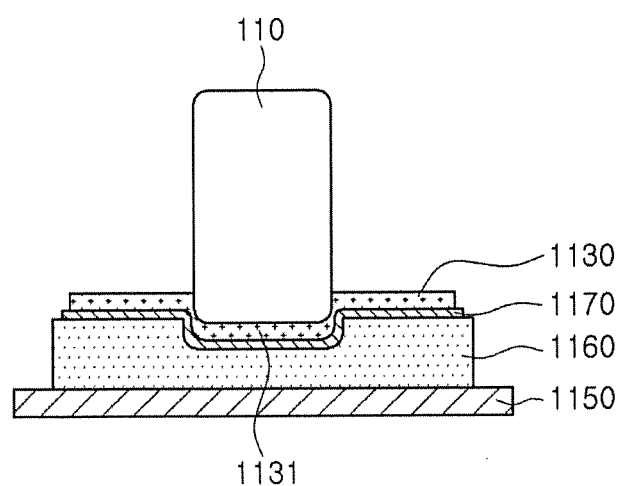
Figure 5C:
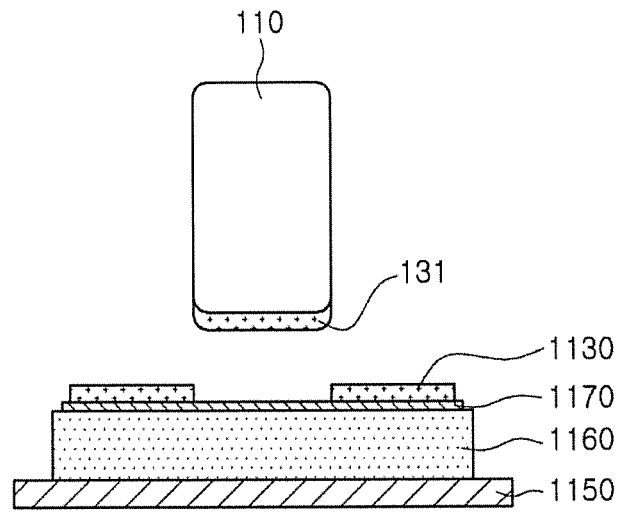

Referring to FIGS. 5A through 5C, the forming of the first and second external electrodes on both end surfaces of the body 110 in the length direction of the body 110 may include preparing the body 110, attaching a punching elastic material 1160 onto a surface plate 1150 and then preparing a member having an external electrode forming sheet 1130 attached to the punching elastic material 1160, and attaching the external electrode forming sheet 1130 to the body 110 by pressurizing and adhering the body 110 to the external electrode forming sheet 1130.

First, in the operation of preparing the body 110, a slurry containing powders such as barium titanate ($BaTiO_3$) powders, or the like, may be first applied and dried onto a carrier film to prepare a plurality of green sheets, thereby forming a dielectric layer.

The green sheet may be manufactured by manufacturing a slurry by mixing the ceramic powder, the binder, and the solvent and manufacturing the slurry in a sheet shape having a thickness of several µm by a doctor blade method.

Next, a conductive paste including the conductive metal powders may be prepared. The conductive metal powder may be nickel (Ni), copper (Cu), palladium (Pd), silver (Ag), lead (Pb), platinum (Pt), or an alloy thereof, a particle average size thereof may be 0.1 to 0.2 µm, and an internal electrode conductive paste including the conductive metal powder of 40 to 50 wt % may be prepared.

An internal electrode pattern may be formed by applying the internal electrode conductive paste on the green sheet by a printing method, or the like. As the method of printing the conductive paste, a screen printing method, a gravure printing method, or the like, may be used. However, the present disclosure is not limited thereto. 200 to 300 layers of the ceramic sheet on which the internal electrode pattern is printed may be laminated, and be pressed and sintered to manufacture the body 110.

The body 110 manufactured as described above may be formed in a hexahedron having both end surfaces in a length direction L of the body, both end surfaces in a width direction W thereof, and both end surfaces in a thickness direction T thereof. That is, the body 110 may include first and second surfaces 1 and 2 opposing each other, third and fourth surfaces 3 and 4 connected to the first and second surfaces 1 and 2 and opposing each other, and fifth and sixth surfaces 5 and 6 opposing each other and connected to the first and second surfaces 1 and 2 connected to the third and fourth surfaces 3 and 4. Here, the first and second surfaces 1 and 2 refer to both end surfaces of the body 110 in the length direction L of the body 110, the third and fourth surfaces 3 and 4 refer to both end surfaces of the body 110 in the thickness direction T of the body 110, and the fifth and sixth surfaces 5 and 6 refer to both end surfaces of the body 110 in the width direction W of the body 110. In addition, the first and second internal electrodes 121 and 122 may each be electrically connected to the first and second external electrodes 131 and 132 formed on the third surface 3 and the fourth surface 4 of the body 110 through portions alternately exposed to both end surfaces of the body in the length direction of the body 110.

Next, the operation of forming the first and second external electrodes on both end surfaces of the body 110 in the length direction of the body 110 may be performed.

First, in order to form the external electrodes on an outer surface of the body 110, the punching elastic material 1160 may be attached to the surface plate 1150, and a member having the external electrode forming sheet 1130 attached to the punching elastic material 1160 may then be prepared.

The method may further include attaching a release film 1170 on the punching elastic material 1160 and attaching the external electrode forming sheet 1130 onto the release film 1170.

The surface plate 1150 may be a material serving as a support of the member used to form the external electrodes on the outer surface of the body 110. Any material may be used without being limited as long as it is a material having low thermal deformation. For example, a stone surface plate made of stone may be used.

The punching elastic material 1160 may serve to cut the external electrode forming sheet 1130 attached to the outer surface of the body 110, to thereby form the external electrodes on both end surfaces of the body 110 in the length direction of the body 110.

The punching elastic material 1160 may be used without being limited as long as it is a material having elasticity. For example, the punching elastic material 1160 may be a punching rubber.

The release film 1170 may also serve to cut the external electrode forming sheet 1130 attached to the outer surface of the body 110, and the material thereof is not limited. For example, the release film 1170 may be a PET film.

The external electrode forming sheet 1130 may be in a state in which the external electrode forming paste is thinly coated, and then may be completed, up to a dry operation.

Specifically, the external electrode forming paste may be prepared by mixing a conductive metal including copper (Cu), nickel (Ni), palladium (Pd), platinum (Pt), gold (Au), silver (Ag), lead (Pb), or an alloy thereof with a binder, a plasticizer, a dispersing agent, or the like.

Next, when the external electrode forming part is coated according to a necessary thickness of the external electrode using doctor blade casting equipment, or the like, and the dry operation is then performed, the external electrode forming sheet 1130 may be prepared.

In general, in the prior art, as a method for forming the external electrodes on the outer surface of the body, a method for dipping the body in the external electrode paste has been used.

However, in a case in which the external electrodes are formed by the conventional dipping method, since it is difficult to uniformly coat due to a scattering occurrence of the body and fluidity and viscosity of the paste, a coating thickness difference of the paste occurred.

In addition, the plating solution may permeate the portion in which the part is thinly coated, due to low compactness, to cause a degradation of reliability, and a glass beading or a blister, in which glass is exposed to the surface, may occur in the portion to which paste is thickly coated, to cause plating defect and shape defect problems. As a result, there has been a problem such that a thickness of the plating layer needed to be increased.

However, according to an exemplary embodiment, the coating thickness of the external electrodes may be thin and uniform by forming the external electrodes on the outer surface of the body by a sheet transfer or pad transfer method, not by the conventional dipping method, in the operation of forming the external electrodes on the outer surface of the body.

Thereby, since a formation area of the internal electrodes may be increased, capacitance may be significantly increased as compared to an existing capacitor having the same size.

Referring to FIG. 5B, the external electrode forming sheet 1130 may be attached to the body 110 by pressurizing and adhering the third surface of the body 110 to the external electrode forming sheet 1130.

Referring to FIG. 5C, the external electrode 131 may be formed on one end surface of the body in the length direction of the body 110 by cutting the external electrode forming sheet 1130 with the punching elastic material 1160.

In addition, in a case in which the release film 1170 is attached to the punching elastic material 1160, since the external electrode forming sheet 1130 is cut by the release film 1170, the external electrodes 131 may be formed on both end surfaces of the body 110 in the length direction of the body 110.

The external electrode forming sheet 1130 may be cut from corner portions of the body 110 by the release film 1170.

As a method for forming the external electrodes 131 on both end surfaces of the body 110 in the length direction of the body 110, a sheet transfer or pad transfer method unlike the conventional dipping method may be used.

Although FIG. 5C illustrates the operation of forming only one external electrode 131, an operation of forming another external electrode on the other end surface of the body 110 in the length direction of the body 110 may be added.

Figure 6A:
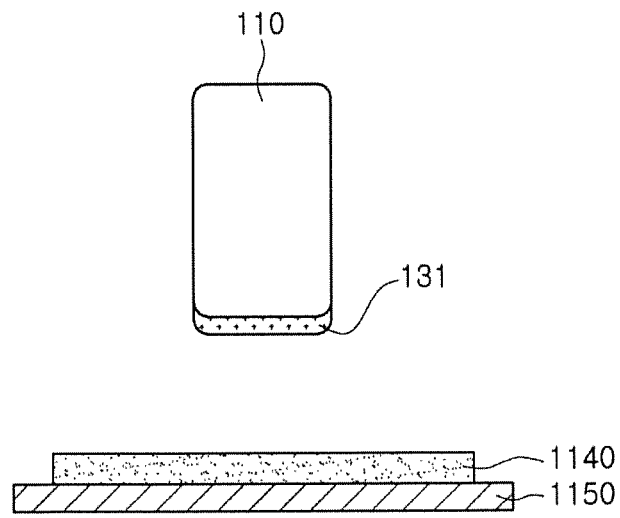
Figure 6B:
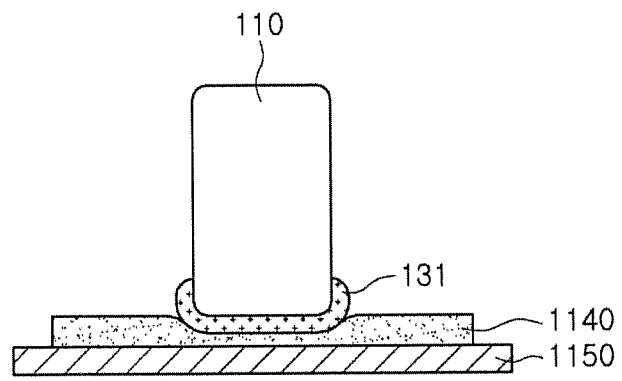
Figure 6C:
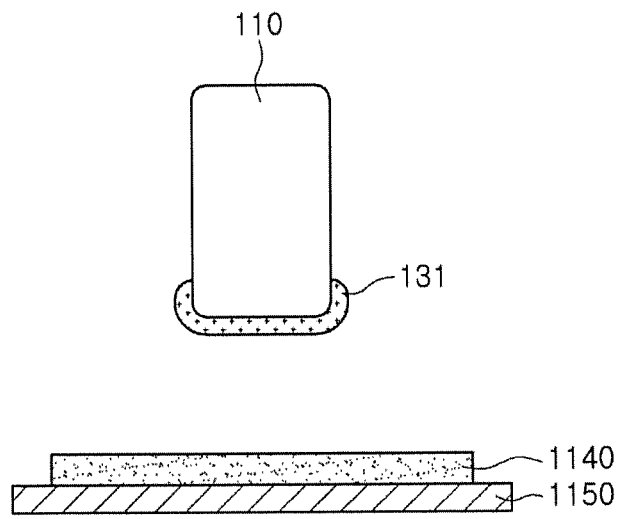

FIGS. 6A through 6C are process views of forming external electrodes of a capacitor according to another embodiment in the present disclosure.

Referring to FIGS. 6A through 6C, the operation of forming the external electrode 131 on both end surfaces of the body in the length direction of the body 110 may include preparing a member having a pressurized elastic material 1140 attached to the surface plate 1150, and forming extension portions by heating the surface plate 1150 to pressurize and adhere the body 110 to the pressurized elastic material 1140 and to extend the external electrode 131 to the first surface 1, second surface 2, fifth surface 5, and sixth surface 6 of the body 110.

In FIG. 5C, the external electrode 131 may extend up to the first surface 1, second surface 2, fifth surface 5, and sixth surface 6 of the body 110 by pressurizing the body 110, having the external electrode formed on both end surfaces of the body 110 in the length direction of the body 110, to the member having the pressurized elastic material 1140 attached to the surface plate 1150.

Here, since flexibility of the external electrodes formed on both end surfaces of the body 110 in the length direction of the body 110 may be increased by heating the surface plate 1150, the external electrodes may extend up to a band portion of the body 110.

In addition, by heating the surface plate 1150, the external electrodes 131 may extend from the third surface 3 to the first surface 1, second surface 2, fifth surface 5, and sixth surface 6, and adhesion between the body 110 and the external electrodes 131 may also be increased.

The pressurized elastic material 1140 may be used without being limited as long as it is a material having elasticity. For example, the pressurized elastic material 1140 may be a pressurized rubber.

The pressurized rubber may have smaller elasticity than the punching rubber, which is the punching elastic material 1160.

According to an exemplary embodiment, when a thickness of the external electrode 131 in the central portion of the body 110 in the thickness direction of the body 110 is T1, and a thickness of the external electrode 131 at a position at which the outermost internal electrode among the internal electrodes is positioned is T2, a relationship of 0.8≤T2/T1≤1.2 may be satisfied.

The thickness T1 of the external electrode 131 in the central portion of the body 110 in the thickness direction of the body 110 may refer to a thickness of the external electrode encountering a virtual line when the virtual line is drawn in the length direction of the body 110 from the central portion point in the thickness direction of the body 110.

Similarly, the thickness T2 of the external electrode 131, at the position at which the outermost internal electrode among the internal electrodes is positioned, may refer to a thickness of the external electrode encountering a virtual line when the virtual line is drawn in the length direction of the body 110 from the position of the internal electrode disposed at the outermost portion of the body 110 in the thickness direction of the body 110.

Since a ratio of T2/T1 satisfies 0.8≤T2/T1≤1.2, a degradation of reliability may be prevented by reducing a deviation between the thickness T1 of the external electrode 131 in the central portion of the body 110, in the thickness direction of the body 110, and the thickness T2 of the external electrode 131, at the point at which the outermost internal electrode among the internal electrodes is positioned.

In a case in which the ratio of T2/T1 is less than 0.8 or exceeds 1.2, since the thickness deviation of the external electrodes is increased, the plating solution may permeate a portion having a thin thickness, to thereby cause the degradation of reliability.

According to an exemplary embodiment, when a thickness of the external electrode 131 in a corner portion of the body 110 is T3, a relationship of 0.4≤T3/T1≤1.0 may be satisfied.

The thickness T3 of the external electrode 131 in the corner portion of the body 110 may refer to a thickness of the external electrode 131 formed in a region of the corner portion of the body 110.

Since a ratio of T2/T1 satisfies 0.4≤T3/T1≤1.0, a degradation of reliability may be prevented by reducing a deviation between the thickness T1 of the external electrode 131 in the central portion of the body 110 in the thickness direction of the body 110, and the thickness T3 of the external electrode 131 at the corner portion of the body 110.

In a case in which the ratio of T3/T1 is less than 0.4 or exceeds 1.0, since the thickness deviation of the external electrodes is increased, the plating solution may permeate a portion having a thin thickness, to thereby cause the degradation of reliability.

FIGS. 7A through 7F are process views of forming external electrodes of a capacitor according to another embodiment in the present disclosure.

Referring to FIGS. 7A through 7F, a method for manufacturing a capacitor according to another exemplary embodiment may include preparing a body 110, attaching a pressurized elastic material 1140 onto a surface plate 1150 and then preparing a member having an external electrode forming sheet 1130 attached to the pressurized elastic material 1140, attaching the external electrode forming sheet 1130 to the body 110 by pressurizing and adhering the body 110 to the external electrode forming sheet 1130, extending the external electrode forming sheet 1130 up to a band portion of the body 110 by heating the surface plate 1150, preparing a member having a punching elastic material 1160 attached to the surface plate 1150, and forming an external electrode 131 on an outer surface of the body 110 by pressurizing and adhering the body 110 to which the external electrode forming sheet 1130 is attached, onto the punching elastic material 1160, to cut the external electrode forming sheet 1130.

Figures 7A, 7B:
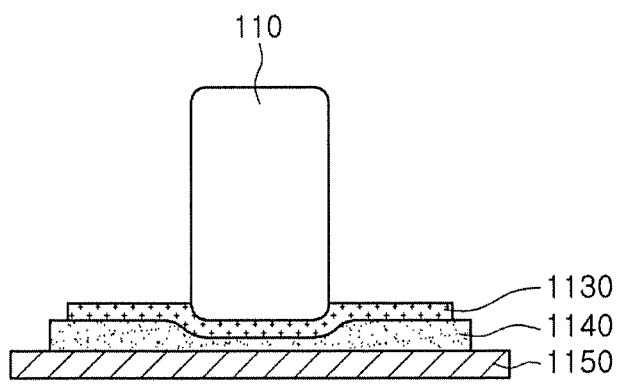

Referring to FIG. 7A, first, a pressurized elastic material 1140 may be attached to a surface plate 1150, and a member having an external electrode forming sheet 1130 attached to the pressurized elastic material 1140 may then be prepared.

Since the surface plate 1150, the pressurized elastic material 1140, and the external electrode forming sheet 1130 have been described above, a repeated description thereof will be omitted hereinafter, and the description of the same contents as in the method for manufacturing the capacitor according to an exemplary embodiment will be omitted.

Referring to FIG. 7B, the external electrode forming sheet 1130 may be attached to the body 110 by pressurizing and adhering the third surface of the body 110 to the external electrode forming sheet 1130.

In this operation, the external electrode forming sheet 1130 may extend up to the first surface 1, second surface 2, fifth surface 5, and sixth surface 6 of the body 110 by heating the surface plate 1150.

Figure 7C:
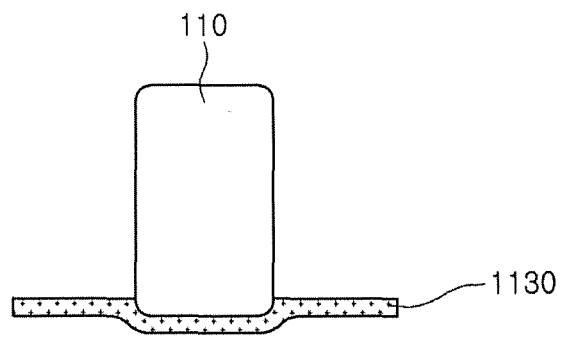

In addition, in a case in which the body 110 is again separated from the member including the surface plate, as illustrated in FIG. 7C, the pressurized elastic material 1140 may be returned to an original position, and the external electrode forming sheet 1130 may be disposed on one end surface of the body 110 in the length direction of the body 110 so as to extend up to the first surface 1, second surface 2, fifth surface 5, and sixth surface 6 of the body 110.

Figure 7D:
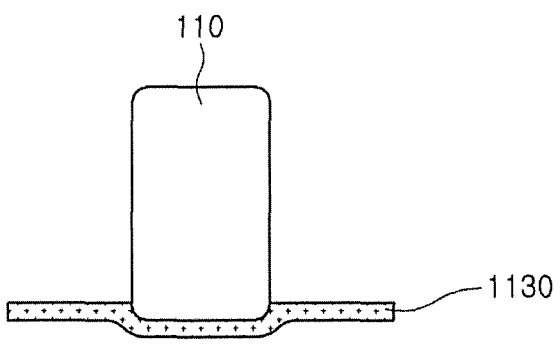
Figure 7E:
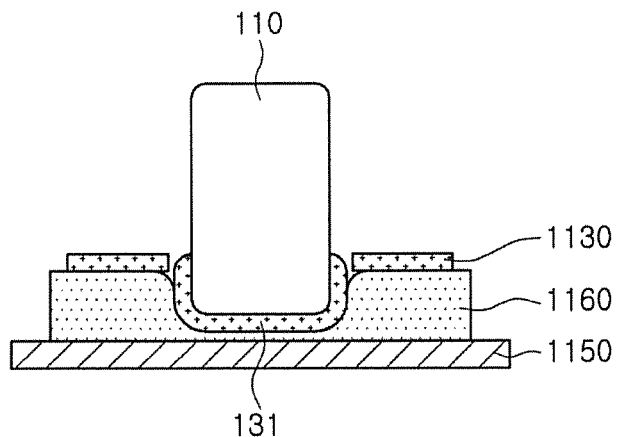

Referring to FIG. 7D, a member having the punching elastic material 1160 attached thereto may be prepared on the surface plate 1150, and, as illustrated in FIG. 7E, an operation of pressurizing and adhering the body 110, to which the external electrode forming sheet 1130 is attached, onto the punching elastic material 1160, to cut the external electrode forming sheet 1130, may be performed.

Figure 7F:
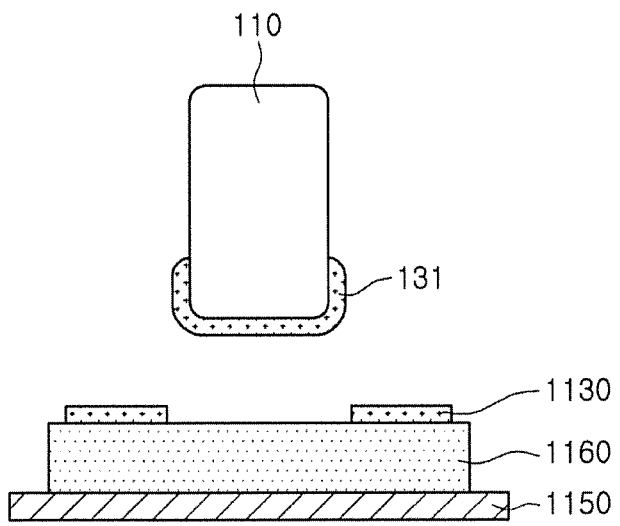
Figure 8:
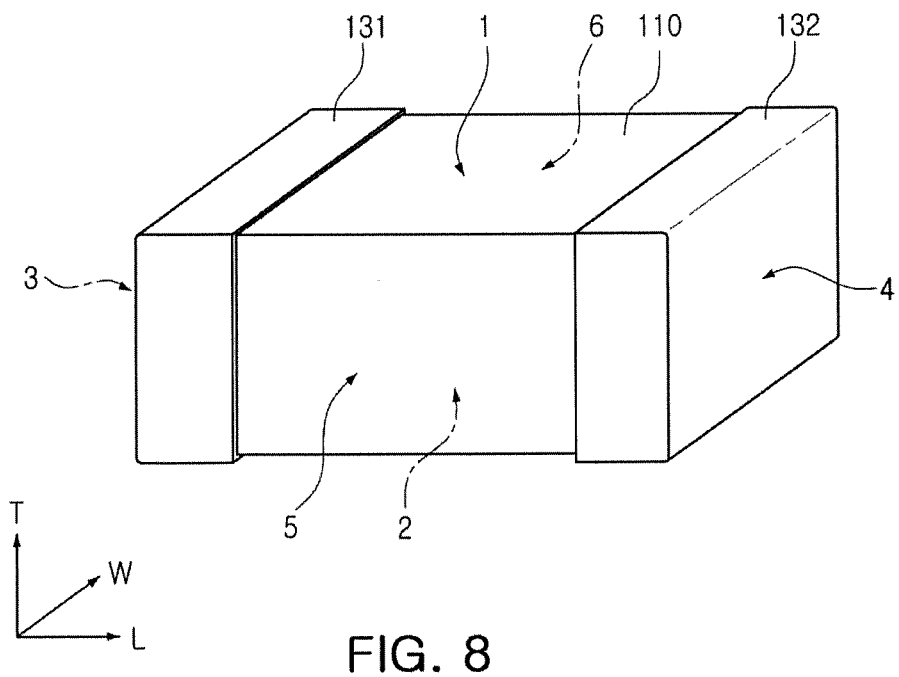

Next, in a case in which the body 110 is again separated from the member including the surface plate, as illustrated in FIG. 7F, the punching elastic material 1160 may be returned to an original position, and the external electrode forming sheet 1130 may extend up to the first surface 1, second surface 2, fifth surface 5, and sixth surface 6 of the body 110, such that the external electrode 131 may be formed on one end surface of the body 110 in the length direction of the body 110, as illustrated in FIG. 8.

After the external electrodes 131 and 132 are formed on the third surface 3 and the fourth surface 4 of the body 110 as described above, an operation of forming a plating prevention member 150 may be performed.

Figure 9:
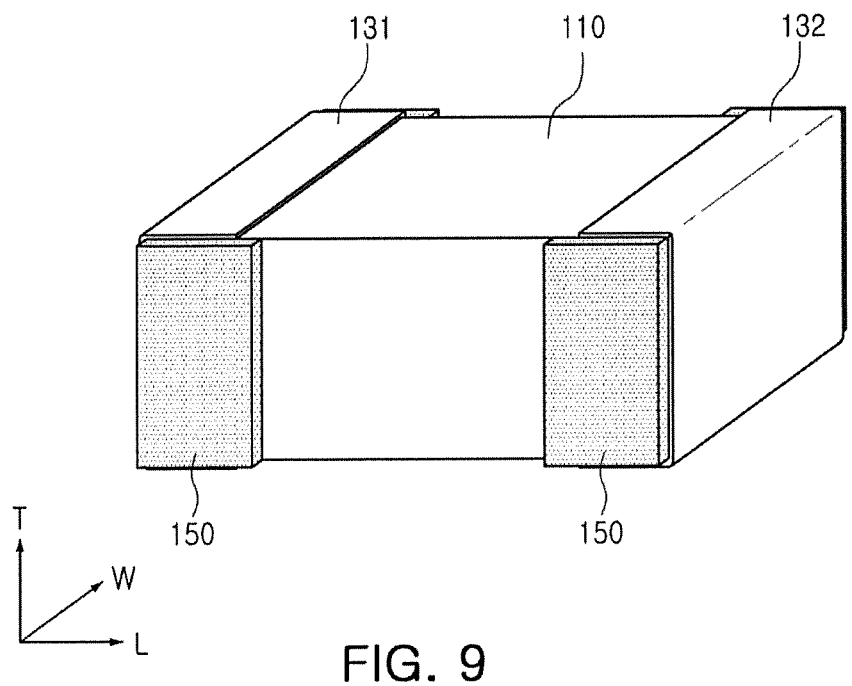

Referring to FIG. 9, the plating prevention member 150 may be formed on both end surfaces of the body 110 in the length direction of the body, that is, the fifth surface 5 and the sixth surface 6 of the body 110.

The plating prevention member 150 may be formed of an insulating material such as an epoxy, or the like, so as to cover the extension portions of the external electrodes 131 and 132 disposed on the fifth surface 5 and the sixth surface 6.

That is, the plating prevention member 150 may be formed on at least a portion of the fifth surface 5 and the sixth surface 6, but is not limited thereto. For example, the plating prevention member 150 may be formed to cover the entirety of the fifth surface 5 and the sixth surface 6.

Figure 10:
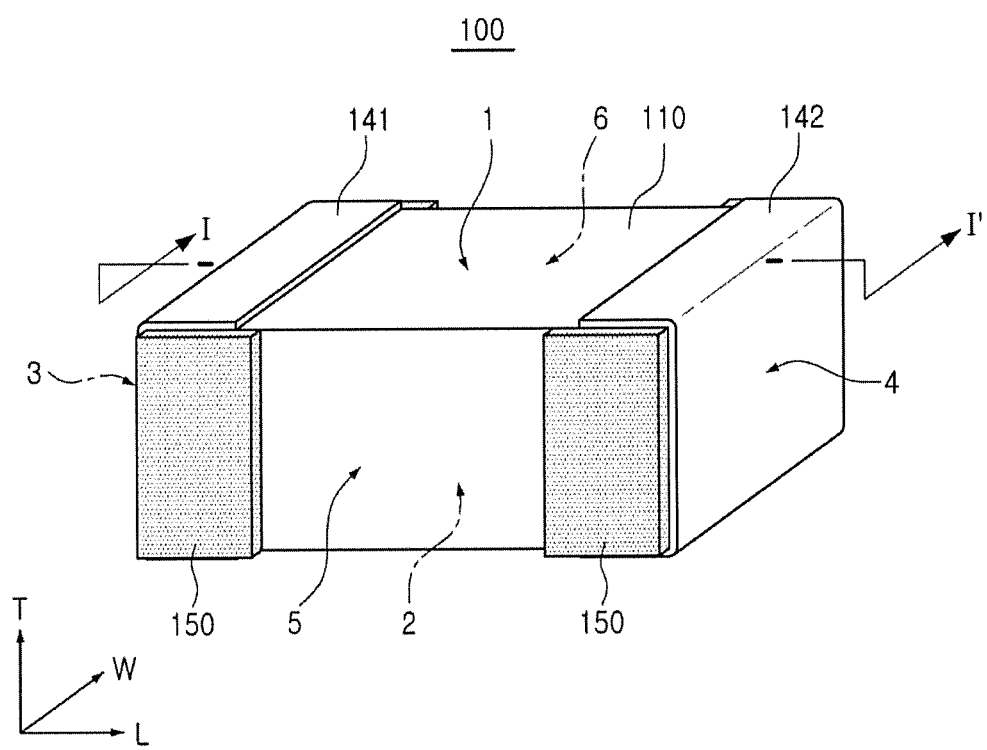

Finally, referring to FIG. 10, an operation of forming a first plating layer 141 on the first external electrode 131 formed on the third surface 3 and forming a second plating layer 142 on the second external electrode 132, formed on the fourth surface 4, may be performed.

In this case, since the plating prevention member 150 is formed on the fifth surface 5 and the sixth surface 6, the plating layer may not be formed on the extension portions of the external electrodes disposed on the fifth surface 5 and the sixth surface 6.

Therefore, the first plating layer 141 may be formed on the third surface of the body 110 and the first and second surfaces 1 and 2 extending from the third surface 3, and the second plating layer 142 may be formed on a fourth surface 4 of the body 110 and the first surface 1 and second surface 2 extending from the fourth surface 4.

As set forth above, according to the exemplary embodiments in the present disclosure, since the capacitor includes the plating prevention member covering the extension portion of the external electrodes disposed on both end surfaces of the body in the length direction of the body, the solder is prevented from being formed on the end surfaces of the capacitors when the capacitor is mounted on the board, whereby mounting density of the capacitor in the width direction of the capacitor may be increased.

Further, according to another exemplary embodiment, when the thickness of the external electrode in the central portion in the thickness direction of the body is T1, and the thickness of the external electrode at a point at which the outermost internal electrode among the internal electrodes is positioned is T2, since the capacitor satisfies the relationship of 0.8≤T2/T1≤1.2, mounting density of the capacity in the length direction of the capacitor may be improved by forming the external electrodes as the thin film, to have the uniform thickness and reduce the length required to mount the capacitor.

While exemplary embodiments have been shown and described above, it will be apparent to those skilled in the art that modifications and variations could be made without departing from the scope of the present invention, as defined by the appended claims.

What is claimed is:

1. A capacitor comprising:
   a body including dielectric layers and a plurality of first and second internal electrodes which are alternately disposed while having the dielectric layers therebetween, the body including first and second surfaces opposing each other, third and fourth surfaces connected to the first and second surfaces and opposing each other, and fifth and sixth surfaces opposing each other and connected to the first and second surfaces and to the third and fourth surfaces, and one terminal of each of the first and second internal electrodes being exposed through the third and fourth surfaces of the body;
   a first external electrode disposed on the third surface and including a first extension portion extending from the third surface to portions of the first, second, fifth, and sixth surfaces, adjacent to the third surface;
   a second external electrode disposed on the fourth surface and including a second extension portion extending from the fourth surface to portions of the first, second, fifth, and sixth surfaces, adjacent to the fourth surface; and
   a plating prevention member covering the first and second extension portions disposed on the fifth surface and the sixth surface, and not disposed on the third surface and fourth surface,
   wherein the plating prevention member covers the entirety of the fifth surface and the sixth surface.

2. The capacitor of claim 1, wherein 0.8<T2/T1<1.2 is satisfied, in which T1 is a thickness of the first external electrode in a central portion of the body in a thickness direction of the body and T2 is a thickness of the first external electrode at a position at which the outermost first internal electrode among the first internal electrodes is positioned.

3. The capacitor of claim 1, further comprising:
   a first plating layer disposed on the first external electrode disposed on the third surface; and
   a second plating layer disposed on the second external electrode disposed on the fourth surface.

4. The capacitor of claim 3, wherein the first plating layer extends to portions of the first and second surfaces, and the second plating layer extends to portions of the first and second surfaces.

5. A capacitor comprising:
   a body including dielectric layers and a plurality of first and second internal electrodes which are alternately disposed while having the dielectric layers therebetween, the body including first and second surfaces opposing each other, third and fourth surfaces connected to the first and second surfaces and opposing each other, and fifth and sixth surfaces opposing each other and connected to the first and second surfaces and to the third and fourth surfaces, and one terminal of each of the first and second internal electrodes being exposed through the third and fourth surfaces of the body;
   a first external electrode disposed on the third surface and including a first extension portion extending from the third surface to portions of the first, second, fifth, and sixth surfaces, adjacent to the third surface;
   a second external electrode disposed on the fourth surface and including a second extension portion extending from the fourth surface to portions of the first, second, fifth, and sixth surfaces, adjacent to the fourth surface;
   a plating prevention member covering the first and second extension portions disposed on the fifth surface and the sixth surface, and not disposed on the third surface and fourth surface; a first plating layer disposed on the first external electrode disposed on the third surface; and
   a second plating layer disposed on the second external electrode disposed on the fourth surface,
   wherein no plating layer is disposed on the fifth surface and the sixth surface.

6. A capacitor comprising:
   a body including dielectric layers and a plurality of first and second internal electrodes which are alternately disposed while having the dielectric layers therebetween, the body including first and second surfaces opposing each other, third and fourth surfaces connected to the first and second surfaces and opposing each other, and fifth and sixth surfaces opposing each other and connected to the first and second surfaces and to the third and fourth surfaces, and one terminal of each of the first and second internal electrodes being exposed through the third and fourth surfaces of the body;

a first external electrode including a first connecting part disposed on the third surface and including a first extension portion extending from the first connecting part to portions of the first, second, fifth, and sixth surfaces, adjacent to the third surface;

a second external electrode including a second connecting part disposed on the fourth surface and including a second extension portion extending from the second connecting part to portions of the first, second, fifth, and sixth surfaces, adjacent to the fourth surface;

a first plating layer covering the first connecting part of the first external electrode and extending from the third surface only to the first and second surfaces; and a second plating layer covering the second connecting part of the second external electrode and extending from the fourth surface only to the first and second surfaces.

7. The capacitor of claim 6, wherein $0.8<T2/T1<1.2$ is satisfied, in which $T1$ is a thickness of the first external electrode in a central portion of the body in a thickness direction of the body and $T2$ is a thickness of the first external electrode at a position at which the outermost first internal electrode among the first internal electrodes is positioned.

8. The capacitor of claim 6, further comprising:
first and second prevention members spaced apart from each other, and covering the first and second extension portions on the fifth surface, respectively; and
third and fourth prevention members spaced apart from each other, and covering the first and second extension portions on the sixth surface, respectively.

9. The capacitor of claim 6, further comprising:
a first plating prevention member covering the entirety of the fifth surface; and
a second plating prevention member covering the entirety of the sixth surface.

10. A capacitor comprising:
a body including dielectric layers and a plurality of first and second internal electrodes which are alternately disposed in a thickness direction while having the dielectric layers therebetween, the body including first and second surfaces opposing each other, third and fourth surfaces connected to the first and second surfaces and opposing each other, and fifth and sixth surfaces opposing each other and connected to the first and second surfaces and to the third and fourth surfaces, and one terminal of each of the first and second internal electrodes being exposed through the third and fourth surfaces of the body;

a first external electrode including a first connecting part disposed on the third surface and including a first extension portion extending from the first connecting part to portions of the first, second, fifth, and sixth surfaces, adjacent to the third surface;

a second external electrode including a second connecting part disposed on the fourth surface and including a second extension portion extending from the second connecting part to portions of the first, second, fifth, and sixth surfaces, adjacent to the fourth surface;

a first plating layer covering at least the first extension portion disposed on the first surface; and a second plating layer covering at least the second extension portion disposed on the first surface, wherein $0.8<T2/T1<1.2$ is satisfied, in which $T1$ is a thickness of a portion of the first connecting part in a central portion of the body in the thickness direction of the body and $T2$ is a thickness of another portion of the first connecting part at a position, at which the outermost first internal electrode in the thickness direction among the first internal electrodes is positioned, the first plating layer extends from the first surface only onto the third surface and the second surface, and the second plating layer extends from the first surface only onto the fourth surface and the second surface.

11. The capacitor of claim 10, further comprising:
first and second prevention members spaced apart from each other, and covering the first and second extension portions on the fifth surface, respectively; and
third and fourth prevention members spaced apart from each other, and covering the first and second extension portions on the sixth surface, respectively.

12. The capacitor of claim 10, further comprising:
a first plating prevention member covering the entirety of the fifth surface; and
a second plating prevention member covering the entirety of the sixth surface.

* * * * *